(12) United States Patent
Ide et al.

(10) Patent No.: US 9,482,473 B2
(45) Date of Patent: Nov. 1, 2016

(54) GELATINOUS LATENT HEAT STORAGE MEMBER WITH BENARD CELL REGIONS

(75) Inventors: Tetsuya Ide, Osaka (JP); Tomoko Kase, Osaka (JP); Yuka Utsumi, Osaka (JP); Yasuyuki Umenaka, Osaka (JP); Takashi Yamashita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 340 days.

(21) Appl. No.: 14/233,216

(22) PCT Filed: Jul. 23, 2012

(86) PCT No.: PCT/JP2012/068628
§ 371 (c)(1),
(2), (4) Date: Jan. 16, 2014

(87) PCT Pub. No.: WO2013/015258
PCT Pub. Date: Jan. 31, 2013

(65) Prior Publication Data
US 2014/0144604 A1    May 29, 2014

(30) Foreign Application Priority Data

Jul. 27, 2011 (JP) ................................ 2011-164388

(51) Int. Cl.
*F28D 17/00* (2006.01)
*F28D 20/02* (2006.01)
(Continued)

(52) U.S. Cl.
CPC ............. *F28D 20/025* (2013.01); *B21D 53/02* (2013.01); *C09K 5/063* (2013.01); *F28D 20/023* (2013.01);
(Continued)

(58) Field of Classification Search
CPC ............ C08K 3/10; C08K 3/28; C09K 5/00; C09K 5/063; Y10T 428/16–428/169; Y10T 428/24802; Y10T 428/24893; Y10T 428/24992; Y10T 428/25–428/259; Y10T 428/24149–428/24165; Y10T 29/49357; F28D 20/025; F28D 20/023; Y02E 60/145; B21D 53/02
USPC ..................... 165/10; 524/428, 437; 428/206
See application file for complete search history.

(56) References Cited

U.S. PATENT DOCUMENTS 3,730,091 A * 5/1973 Gaynor .................... B41M 5/04
101/471
4,054,124 A * 10/1977 Knoos .................... F24J 2/0483
126/584

(Continued)

FOREIGN PATENT DOCUMENTS

JP    57-074589 A    5/1982
JP    61-205793 A    9/1986
(Continued)

OTHER PUBLICATIONS

Zhang et al.—20110205—NPL on Novel gelatinous shape-stabilized phase change materials.*
(Continued)

*Primary Examiner* — Judy Swann
*Assistant Examiner* — Jose O Class-Quinones
(74) *Attorney, Agent, or Firm* — Keating & Bennett, LLP

(57) ABSTRACT

An object of the present invention is to provide a readily produced and easily handled heat storage member. The heat storage member 1 has a rectangular plane surface of, for example, 15 (cm)×20 (cm), and has a thickness of, for example, 10 to 15 mm. The heat storage member 1 includes a gelatinous latent heat storage material 12, and a large number of highly heat conductive fillers 14 dispersed in the latent heat storage material 12. The highly heat conductive fillers 14 are mixed in the latent heat storage material 12 with a bias in dispersion density. In the rectangular plane surface of the heat storage member 1, a periodic pattern is formed in combination of cellular (cell-like) regions 10, which are demarcated by, for example, hexagonal contour lines 16 and which are periodically arrayed in the vertical and horizontal directions.

7 Claims, 6 Drawing Sheets

(51) Int. Cl.
*C09K 5/06* (2006.01)
*B21D 53/02* (2006.01)
*C08K 3/28* (2006.01)
*C08K 3/10* (2006.01)

(52) U.S. Cl.
CPC . *C08K 3/10* (2013.01); *C08K 3/28* (2013.01); *Y02E 60/145* (2013.01); *Y10T 29/49357* (2015.01); *Y10T 428/24802* (2015.01); *Y10T 428/24893* (2015.01); *Y10T 428/24992* (2015.01); *Y10T 428/254* (2015.01)

(56) References Cited

U.S. PATENT DOCUMENTS

| | | | | |
|---|---|---|---|---|
| 4,138,992 | A * | 2/1979 | Shaffer | F24J 2/0461 |
| | | | | 126/561 |
| 4,408,659 | A * | 10/1983 | Hermanns | F28D 13/00 |
| | | | | 165/10 |
| 4,575,432 | A * | 3/1986 | Lin | H01B 1/20 |
| | | | | 252/511 |
| 4,625,710 | A * | 12/1986 | Harada | F24J 2/34 |
| | | | | 126/619 |
| 4,751,797 | A * | 6/1988 | Fujimori | B24B 11/00 |
| | | | | 451/527 |
| 7,235,301 | B2 * | 6/2007 | Bacher | C09K 5/063 |
| | | | | 428/408 |
| 2003/0152764 | A1 * | 8/2003 | Bunyan | C09K 5/063 |
| | | | | 428/328 |
| 2007/0175609 | A1 | 8/2007 | Christ et al. | |
| 2007/0281304 | A1 * | 12/2007 | Gianchandani | B01L 3/502761 |
| | | | | 435/287.2 |
| 2009/0236079 | A1 * | 9/2009 | Khodadadi | B82Y 30/00 |
| | | | | 165/104.21 |

FOREIGN PATENT DOCUMENTS

| | | |
|---|---|---|
| JP | 01-217136 A | 8/1989 |
| JP | 05-296676 A | 11/1993 |
| JP | 2004-189999 A | 7/2004 |
| JP | 2007-205710 A | 8/2007 |
| JP | 2010-255896 A | 11/2010 |

OTHER PUBLICATIONS

Sari—Aug. 2004—NPL on Form Stable Paraffin and Polyethylene Composites for Phase Change Materials.*
Xiao et al.—Jan. 2002—NPL on Preparation and Performance of Shape Stabilized Phase Change Storage Materials.*
Xiao et al.—Oct. 2001—NPL on Thermal Performance of a High Conductive Shape Stabilized Storage Materials.*
Official Communication issued in International Patent Application No. PCT/JP2012/068628, mailed on Oct. 9, 2012.
Enya, "Basis of heat transfer engineering for energy technology" Publisher: Ohmsha, Feb. 1982, pp. 132-133.

* cited by examiner

FIG. 4
(a) 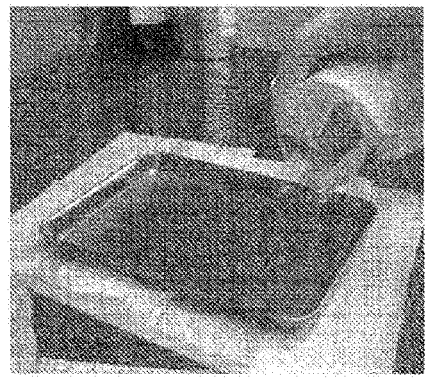
(b) 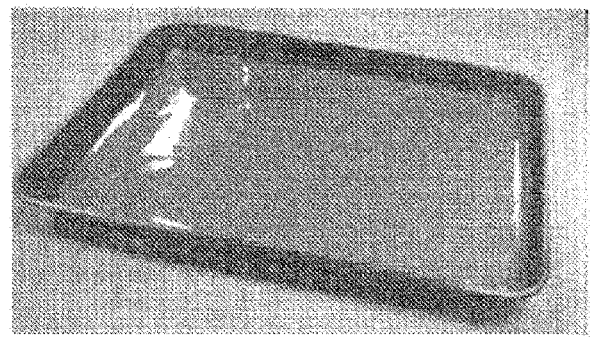
(c) 
(d) 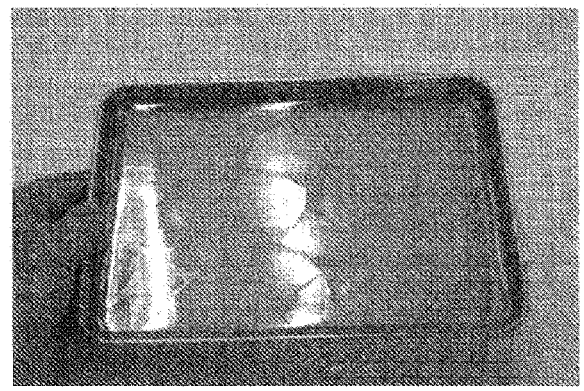

GELATINOUS LATENT HEAT STORAGE MEMBER WITH BENARD CELL REGIONS

TECHNICAL FIELD

The present invention relates to a heat storage member.

BACKGROUND ART

Patent Literature (PTL) 1 discloses a latent heat storage device employing a composite material, which includes a graphite foil sheet arranged in combination with a latent heat storage material having a low thermal conductivity, with intent to increase thermal conductivity in the direction of thickness and to increase efficiency of heat exchange.

CITATION LIST

Patent Literature

PTL 1: Japanese Unexamined Patent Application Publication No. 2007-205710

SUMMARY OF INVENTION

Technical Problem

However, the latent heat storage device disclosed in PTL 1 has the problem that, because the graphite foil sheets having low mechanical strength are vertically arrayed, the composite material is difficult to produce and is not easy to handle.

An object of the present invention is to provide a readily produced and easily handled heat storage member.

Solution to Problem

The above object can be achieved with a heat storage member comprising a gelatinous latent heat storage material, and a large number of highly heat conductive fillers dispersed in the latent heat storage material with a bias in dispersion density.

In the above-described heat storage member according to the present invention, polygonal contour lines are formed in a surface of the latent heat storage material.

In the above-described heat storage member according to the present invention, the heat storage member includes cellular regions, each comprising a columnar region demarcating the latent heat storage material by planes, which include the contour lines, in a direction of thickness of the latent heat storage material, and the large number of highly heat conductive fillers dispersed in the columnar region with a bias in dispersion density.

In the above-described heat storage member according to the present invention, a central axial region including a central axis connecting upper and lower surfaces of the columnar region and vicinity of the central axis has a higher thermal conductivity characteristic in a direction of the central axis than a peripheral region on outer side of the central axial region within the columnar region.

In the above-described heat storage member according to the present invention, the peripheral region has a higher heat storage characteristic than the central axial region.

In the above-described heat storage member according to the present invention, the highly heat conductive fillers in the central axial region are aggregated at a higher density than the highly heat conductive fillers in the peripheral region.

In the above-described heat storage member according to the present invention, weight of the latent heat storage material in the peripheral region is larger than weight of the latent heat storage material in the central axial region.

In the above-described heat storage member according to the present invention, a periodic pattern is formed in combination of the cellular regions, which are periodically arrayed in vertical and horizontal directions.

In the above-described heat storage member according to the present invention, the heat storage material contains a gelling agent.

In the above-described heat storage member according to the present invention, the gelling agent contains a polymer material.

In the above-described heat storage member according to the present invention, the latent heat storage material contains paraffin.

The above object is further achieved with a method of producing a heat storage member, the method comprising the steps of heating and melting a latent heat storage material mixed with a gelling agent, dispersing highly heat conductive fillers into the melted latent heat storage material, pouring the latent heat storage material including the highly heat conductive fillers dispersed therein into a tray, which is heated at a bottom portion, thereby forming Benard cells in the latent heat storage material through convection, and cooling the tray to gel the latent heat storage material such that the Benard cells are solidified and the cellular regions are formed.

In the above-described method of producing the heat storage member according to the present invention, polygonal contour lines are formed in a surface of the latent heat storage material at boundaries between the Benard cells adjacent to each other, and the cellular regions are each formed as a columnar region demarcating the latent heat storage material by planes, which include the contour lines, in a direction of thickness of the latent heat storage material, the highly heat conductive fillers being dispersed in the columnar region with a bias in dispersion density.

In the above-described method of producing the heat storage member according to the present invention, a central axial region including a central axis connecting upper and lower surfaces of the columnar region and vicinity of the central axis is formed to have a higher thermal conductivity characteristic in a direction of the central axis than a peripheral region on outer side of the central axial region within the columnar region.

In the above-described method of producing the heat storage member according to the present invention, the peripheral region is formed to have a higher heat storage characteristic than the central axial region.

In the above-described method of producing the heat storage member according to the present invention, the highly heat conductive fillers in the central axial region are aggregated at a higher density than the highly heat conductive fillers in the peripheral region.

In the above-described method of producing the heat storage member according to the present invention, weight of the latent heat storage material in the peripheral region is larger than weight of the latent heat storage material in the central axial region.

In the above-described method of producing the heat storage member according to the present invention, a periodic pattern is formed in combination of the cellular regions, which are periodically arrayed in vertical and horizontal directions.

Advantageous Effects of Invention

According to the present invention, a readily produced and easily handled heat storage member can be realized.

BRIEF DESCRIPTION OF DRAWINGS

FIG. 4 is an explanatory view to explain a method of producing the heat storage member according to one embodiment of the present invention.

DESCRIPTION OF EMBODIMENTS

Figure 1:
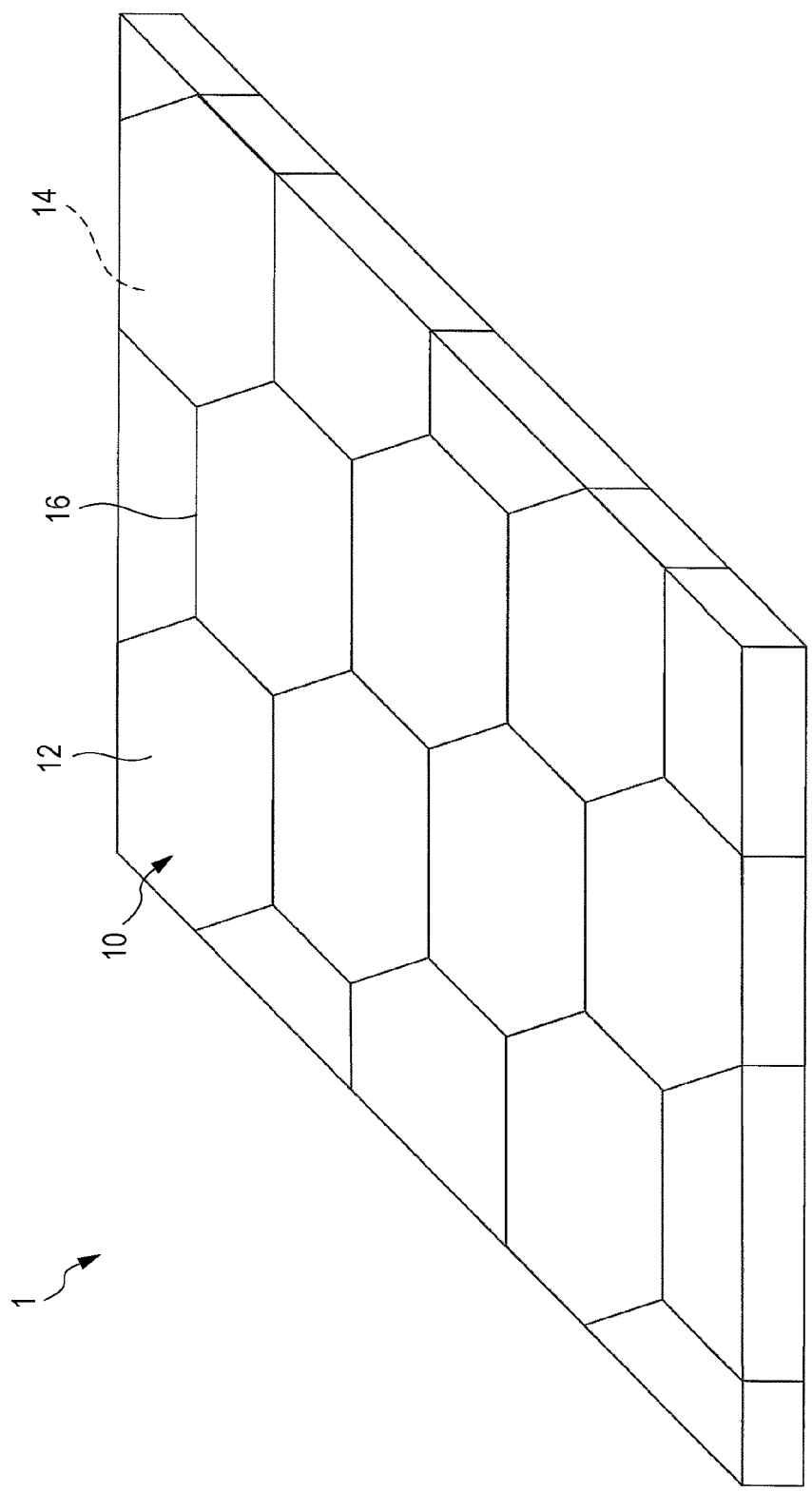
FIG. 1 is a perspective view of a heat storage member according to one embodiment of the present invention.

A heat storage member according to one embodiment of the present invention will be described below with reference to FIGS. 1 to 6. It is to be noted that, for easier understanding, all the drawings referred to below are illustrated with dimensions and relative proportions of constituent elements set different from actual ones as appropriate. First, the external appearance of a heat storage member 1 according to the embodiment is described with reference to FIG. 1. FIG. 1 is a perspective view of the heat storage member 1. The heat storage member 1 has a thin-plate shape (or a sheet-like shape) in its entirety. The heat storage member 1 of the embodiment has a rectangular plane surface of, for example, 15 (cm)×20 (cm), and has a thickness of, for example, 10 to 15 mm. The heat storage member 1 includes a gelatinous latent heat storage material 12, and a large number of highly heat conductive fillers 14 dispersed in the latent heat storage material 12. The highly heat conductive fillers 14 in the form of fine powdery particles are mixed in the latent heat storage material 12 with a bias in dispersion density. On the rectangular plane surface of the heat storage member 1, a periodic pattern is formed in combination of cellular (cell-like) regions 10, which are demarcated by, for example, hexagonal contour lines 16 and which are periodically arrayed in the vertical and horizontal directions. The cellular regions 10 are formed in such a way that the shapes of Benard cells generated through a method, described later with reference to FIG. 4, of producing the heat storage member 1 remain even after gelation of the latent heat storage material 12.

Figure 2:
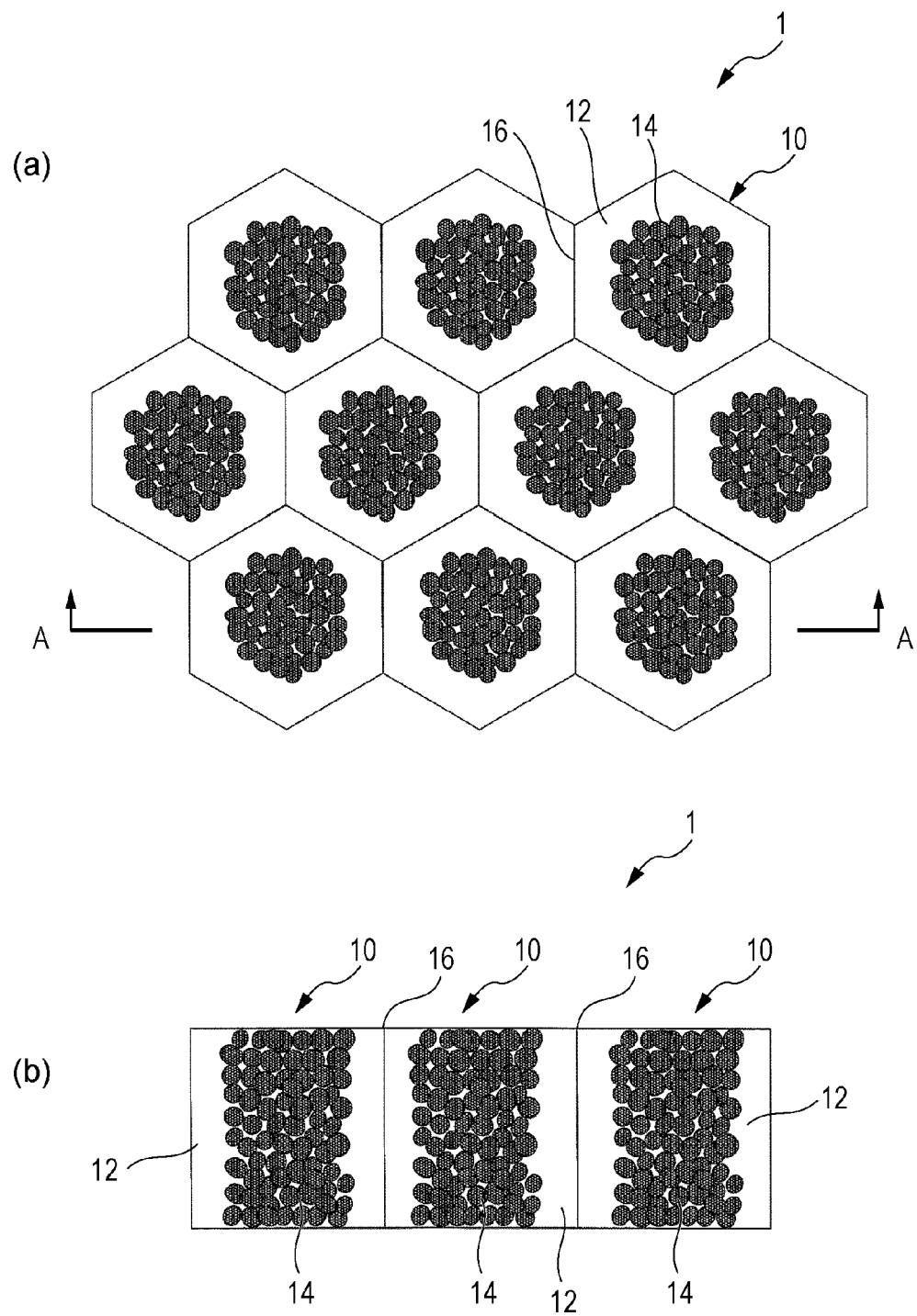
FIG. 2 is an explanatory view to explain cellular regions 10 of the heat storage member according to one embodiment of the present invention.

The cellular regions 10 of the heat storage member 1 will be described below with reference to FIG. 2. FIG. 2(a) is a schematic plan view illustrating a part of the periodic pattern in combination of plural (10 in FIG. 2(a)) cellular regions 10, which are periodically arrayed in the vertical and horizontal directions. FIG. 2(b) is side sectional view of plural (three in FIG. 2(b)) cellular regions 10 taken along a line A-A in FIG. 2(a).

As illustrated in FIGS. 2(a) and 2(b), each of the cellular regions 10 includes the latent heat storage material 12 in a substantially hexagonal columnar region demarcating the latent heat storage material 12 by planes, which include the contour lines 16, in the direction of thickness of the gelatinous latent heat storage material 12. An upper surface of the hexagonal column defines a part of a front rectangular plate surface of the heat storage member 1, and a lower surface of the hexagonal column defines a part of a rear rectangular plate surface of the heat storage member 1. The longest diagonal line of the hexagonal upper surface has a length of, for example, several cm. Because the distance between the front and rear surfaces of the heat storage member 1 provides a thickness of the heat storage member 1, the distance between upper and lower surfaces of the hexagonal column of the cellular region 10 is equal to the thickness of the heat storage member 1.

A large number of highly heat conductive fillers 14 are dispersed in the gelatinous latent heat storage material 12 occupying the columnar region in each cellular region 10. A dispersion density of the highly heat conductive fillers 14 in the latent heat storage material 12 occupying the columnar region is not uniform, but it is biased.

In the columnar region, a central axial region including a central axis connecting the upper and lower surfaces of the hexagonal column and the vicinity of the central axis has a higher thermal conductivity characteristic in the direction of the central axis than a peripheral region on the outer side of the central axial region. The highly heat conductive fillers 14 in the central axial region are aggregated at a higher density than the highly heat conductive fillers 14 in the peripheral region. In the central axial region, the highly heat conductive fillers 14 in adjacent relation are positively contacted with each other. Therefore, the high thermal conductivity characteristic is obtained in the central axial region.

The dispersion density of the highly heat conductive fillers 14 gradually reduces from the central axial region toward lateral surfaces of the hexagonal column in the peripheral region. Thus, a degree of aggregation of the highly heat conductive fillers 14 reduces monotonously to such an extent that the highly heat conductive fillers 14 in adjacent relation are not contacted with each other in the peripheral region. Accordingly, the thermal conductivity characteristic is lower in the peripheral region than in the central axial region.

On the other hand, corresponding to the above-mentioned bias of the dispersion density of the highly heat conductive fillers 14, weight of the latent heat storage material 12 in the cellular region 10 is distributed to be larger in the peripheral region than in the central axial region. Therefore, a higher heat storage characteristic is obtained in the peripheral region than in the central axial region.

As described above, the cellular region 10 has such an anisotropic thermal conductivity characteristic that the thermal conductivity characteristic is relatively high in the direction of the central axis, and that the thermal conductivity characteristic is relatively low in the direction perpendicular to the central axis. Moreover, the cellular region 10 has such an anisotropic heat storage characteristic that the heat storage characteristic is relatively high in the peripheral region, and that the heat storage characteristic is relatively low in the central axial region.

The heat storage member 1, illustrated in FIG. 1, is obtained by arranging the plural cellular regions 10 in a state where adjacent respective lateral surfaces of the hexagonal columns are contacted with each other, as illustrated in FIG. 2(a). The heat storage member 1 has the high thermal conductivity characteristic in the direction of thickness of the heat storage member 1 while maintaining a sufficient heat storage capability.

Figure 3:
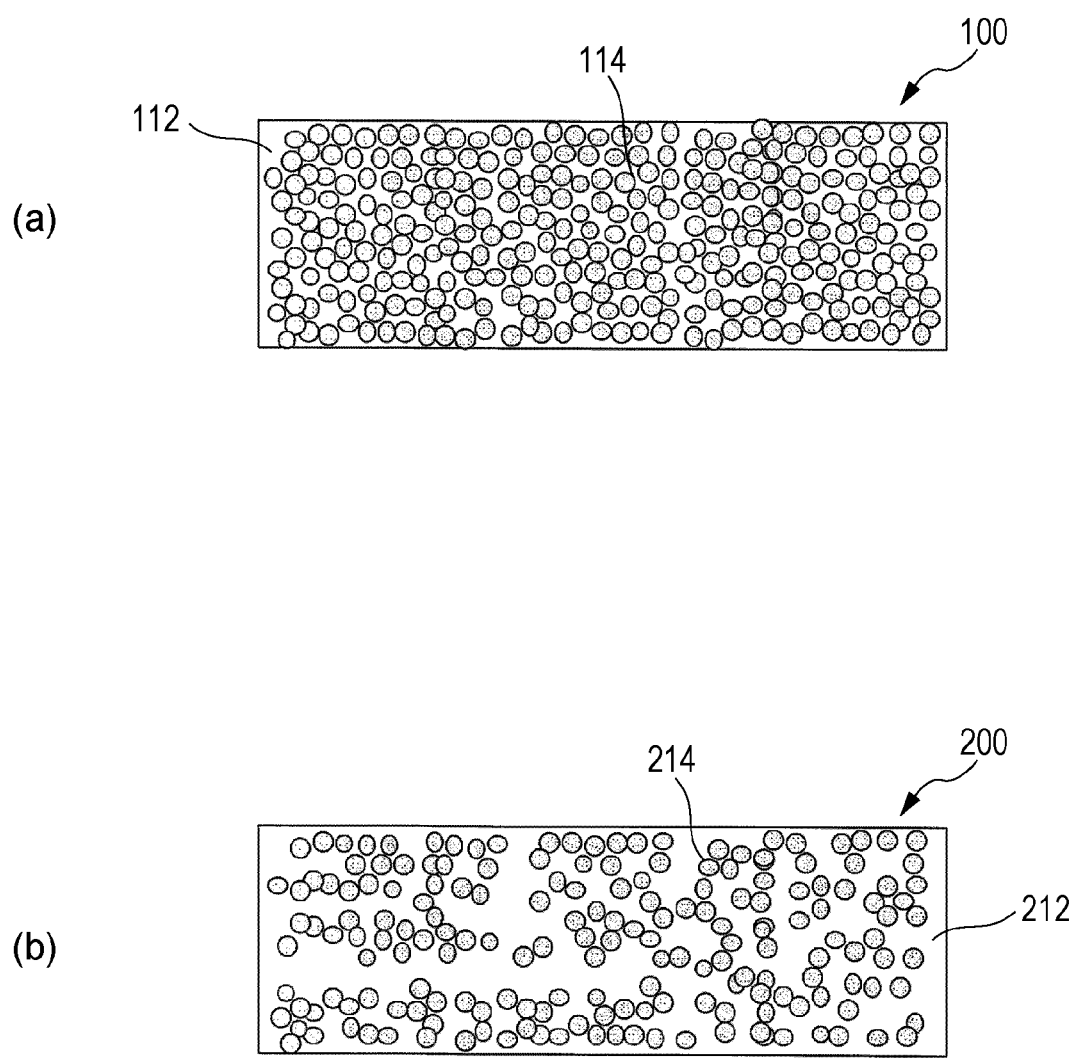
FIG. 3 is an explanatory view to explain the advantageous effect of the heat storage member according to one embodiment of the present invention.

FIG. 3 is an explanatory view to explain the advantageous effect of the heat storage member 1 according to the embodiment. FIG. 3(*a*) illustrates a heat storage member 100 according to COMPARATIVE EXAMPLE 1. FIG. 3(*b*) illustrates a heat storage member 200 according to COMPARATIVE EXAMPLE 2. FIGS. 3(*a*) and 3(*b*) illustrate states looking respective parts of the heat storage members 100 and 200, each of which has the same size as that of the cellular regions 10 illustrated in FIG. 2(*b*), from the same direction. The heat storage member 100 illustrated in FIG. 3(*a*) exhibits a state where, in unit volume, dispersed highly heat conductive fillers 114 occupy a larger volume than a latent heat storage material 112. When the highly heat conductive fillers 114 are dispersed in a larger amount in the latent heat storage material 112 to increase the thermal conductivity of the heat storage member 100, a rate of the latent heat storage material 112 occupying the unit volume reduces, and the heat storage capability degrades.

The heat storage member 200 illustrated in FIG. 3(*b*) exhibits a state where, in unit volume, dispersed highly heat conductive fillers 214 occupies a smaller volume than a latent heat storage material 212. When the highly heat conductive fillers 214 are dispersed in a smaller amount, the highly heat conductive fillers 214 in adjacent relation cannot be contacted with each other, and a high thermal conductivity cannot be obtained in the direction of thickness of the heat storage member.

Thus, in any of COMPARATIVE EXAMPLES 1 and 2, it is impossible to increase the thermal conductivity in the direction of thickness of the heat storage member while holding the sufficient heat storage capability. In contrast, the heat storage member 1 according to the embodiment, illustrated in FIGS. 1 and 2, can increase the thermal conductivity in the direction of thickness of the heat storage member 1 while holding the sufficient heat storage capability, by employing a simple manner.

The technology of temporarily storing heat and taking out the stored heat as required is called "heat storage". The heat storage technology has been studied and practiced in various forms depending on what kinds of materials are used and what kind of physicochemical phenomenon is utilized to store heat. As heat storage techniques, there are known sensible heat storage, latent heat storage, chemical heat storage, and so on. The embodiment utilizes the latent heat storage. In the latent heat storage, thermal energy attributable to phase change of a substance is stored by utilizing latent heat of the substance. The latent heat storage exhibits a high heat storage density and a constant output temperature. Examples of latent heat storage materials include ice (water), paraffin, and inorganic salt.

The latent heat storage material 12 used in the embodiment contains paraffin. Paraffin is a substance, which is a liquid or a semitransparent or white soft solid (wax-like) at ordinary temperature depending on the number of carbons, which is not dissolved into water, and which is chemically stable. In Japan, a simple word "paraffin" is generally used in many cases, but an expression "paraffin wax" is also used to avoid confusion with kerosene (lamp oil). As paraffin for the latent heat storage material 12, normal (straight-chain structure) paraffin (having a general formula of $C_nH_{2n+2}$) is used in a singular or mixed form.

Furthermore, the latent heat storage material 12 contains a gelling agent that gels (solidifies) paraffin. The term "gel" implies a substance in a state resulting through a process of forming a three-dimensional mesh structure with cross-linking of molecules, and absorbing a solvent into the inside so as to swell. Examples of the gel are agar and gelatin. The gel is formed with cross-linking through covalent bonds by the chemical reaction, and it is insoluble and chemically stable unless the structure is broken. The gelling agent exhibits the gelation effect just by being added in amount of several % by weight to paraffin.

In a heat storage member prepared by enclosing, in a container, a liquid-state latent heat storage material in which the highly heat conductive fillers 14 are dispersed, a dispersion characteristic of the highly heat conductive fillers 14 changes with the lapse of time and depending on an installation environment. For example, when the highly heat conductive fillers 14 accumulate in a vertically lower portion within the liquid-state latent heat storage material with the lapse of time, the thermal conductivity characteristic and the heat storage characteristic change in the latent heat storage material. When a liquid-state latent heat storage material is filled in a parallelepiped container having an aspect ratio different from 1, the thermal conductivity characteristic and the heat storage characteristic change depending on whether the parallelepiped container is placed vertically or horizontally. In contrast, in the gelatinous latent heat storage material 12 prepared by filling the latent heat storage material with the gelling agent, the gelatinous latent heat storage material 12 is not liquefied even after coming into a phase-change temperature region, and it maintains the gel state. Therefore, the thermal conductivity characteristic and the heat storage characteristic of the heat storage member 1 will not change.

The gelling agent used in the embodiment contains a polymer material. Polyethylene is used as the polymer material. In other words, the latent heat storage material 12 in the embodiment is polyethylene-containing paraffin that is gelled with polyethylene. Paraffin having the carbon number n of 20 is used in the embodiment. The melting point of paraffin differs depending on the carbon number. The melting point of the paraffin in the embodiment is about 36.8° C. The boiling point of the relevant paraffin exceeds 300° C. The melting point of polyethylene is 130° C. In addition, the viscosity of the latent heat storage material 12 can be changed by adjusting a mixing ratio of polyethylene.

The polyethylene-containing paraffin maintains the solid state in its entirety even when the paraffin undergoes a phase change between a solid phase and a liquid phase. Thus, since the latent heat storage material 12 can maintain the solid state in its entirety before and after the phase change, the latent heat storage material 12 is easy to handle.

Furthermore, the gelled paraffin causes no convection in the liquid phase. Heat from a heat source is stored in the paraffin through only thermal conduction. Thus, since the heat storage performance does not change with the influence of gravity, a degree of freedom in arrangement of the latent heat storage material 12 with respect to the heat source can be increased.

In general, a latent heat storage material stores, as thermal energy, latent heat that is transferred from the outside when a substance causes a phase change. In heat storage utilizing a solid-liquid phase change, for example, heat of melting at the melting point of the latent heat storage material is utilized. As long as two solid and liquid phases are present in a mixed state during the phase change, heat is continuously deprived from the outside at a certain phase-change temperature. Accordingly, temperature can be suppressed from rising in excess of the melting point for a comparatively long time. As a result, the latent heat storage is more excellent in points of heat storage density and holding of the certain temperature than sensible heat storage utilizing the specific heat of a substance.

A material forming the highly heat conductive fillers 14 may be an organic compound or an inorganic compound having a higher melting point than that of the gelling agent. An example of the inorganic compound is aluminum nitride. The thermal conductivity of aluminum nitride is about 200 to 300 W/m·k. Aluminum nitride can be comparatively easily formed into fillers in a spherical or polyhedral particulate form. Moreover, the particle size (size per particle) can be selected in the range of several μm to several tens μm.

A method of producing the heat storage member 1 according to the embodiment will be described below with reference to FIG. 4. First, a predetermined amount of the latent heat storage material 12 mixed with the gelling agent is heated until the latent heat storage material 12 is melted and causes fluidity. Then, the highly heat conductive fillers 14 in predetermined weight are dispersed in the melted latent heat storage material 12. Furthermore, a bottom portion of a rectangular tray (tray-shaped member), into which the melted latent heat storage material 12 is to be poured, is previously heated to a predetermined temperature by a hot plate oven, for example. The rectangular tray has a rectangular bottom surface with a length of 15 cm and a width of 20 cm, and a dept of 3 cm, for example.

Then, as illustrated in FIG. 4(*a*), the melted latent heat storage material 12 including the highly heat conductive fillers 14 dispersed therein is poured into the rectangular tray, of which bottom portion is heated, until the latent heat storage material 12 takes a thickness of about 10 to 15 mm. As result, Benard cells are formed in the melted latent heat storage material 12 through convection.

A phenomenon that, by heating a horizontal liquid layer from below or cooling it from above to provide a predetermined temperature gradient in the vertical direction, the liquid layer is divided into cellular vortex regions, each having a substantially hexagonal shape, is called "Benard convection". The Benard cells imply those cellular vortex regions. In each of the Benard cells, an upward flow generates in a central portion, and a downward flow generates in a peripheral portion. In each Benard cell, the highly heat conductive fillers 14 are dispersed in independent states in the direction of thickness of Benard cell due to the convection, and the dispersion density of the highly heat conductive fillers 14 is biased as illustrated in FIG. 2.

Figure 5:
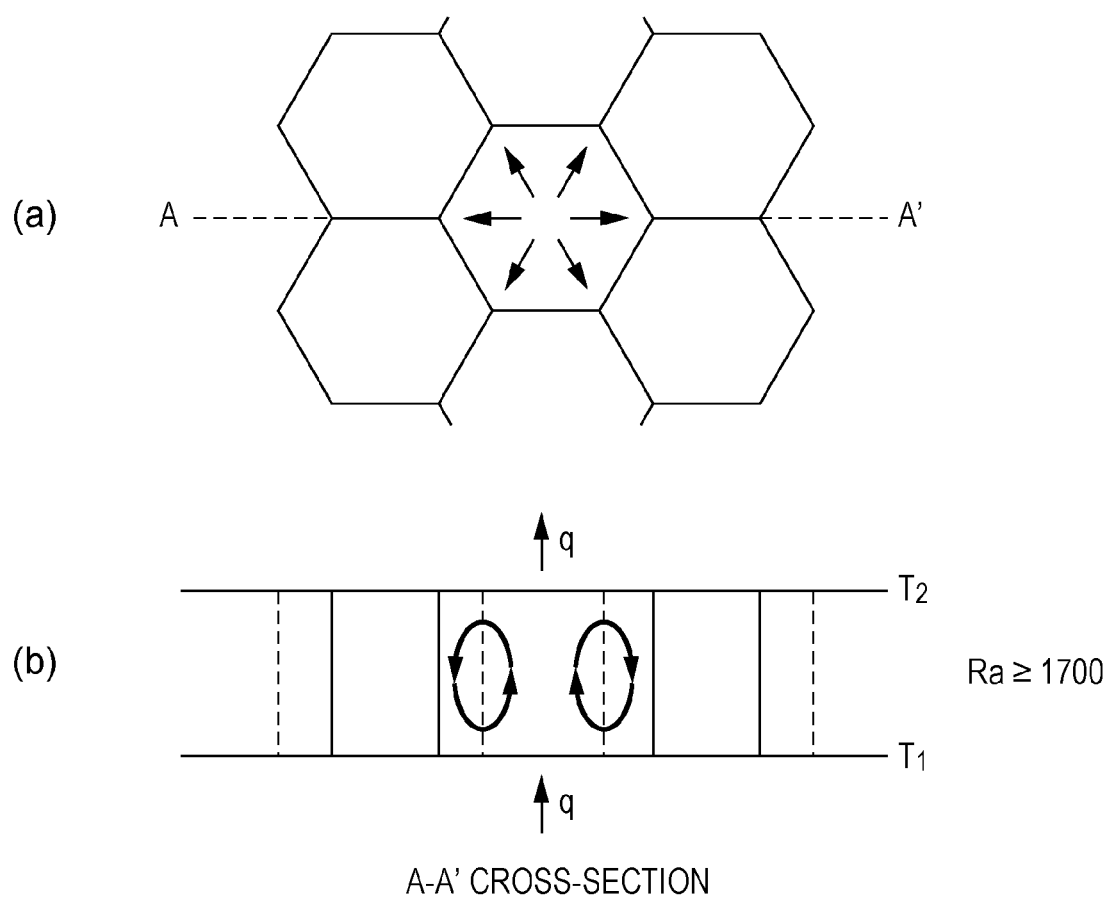
FIG. 5 is an explanatory view to explain Benard cells.

Here, the Benard cell is described with reference to FIG. 5. FIG. 5 is an illustration of Benard cells described in a reference paper (Shintaro Shioji, "Fundamentals of Heat Transfer Engineering for Energy Engineering", Ohmsha, Ltd., Feb. 28, 1982, pp. 132-133). FIG. 5(*a*) is a schematic plan view illustrating a part of a periodic pattern in combination of plural Benard cells, which are periodically arrayed in the vertical and horizontal directions. FIG. 5(*b*) illustrates cross-sections of plural Benard cells taken along a line A-A' in FIG. 5(*a*).

The Benard cells are described in more detail below, based on the above-mentioned reference paper, with reference to FIG. 5. In a horizontal fluid layer limited at upper and lower sides by horizontal surfaces, vortex-like convections are generated at the Rayleigh number (Ra) in a range larger than a certain value on the ground due to the effect of gravity by heating a lower surface or cooling an upper surface of the fluid layer. The critical Ra for generation of the vortex-shaped convections is Ra=1,700 when the upper surface is a solid, and about Ra=1,100 when the upper surface is a free liquid surface.

The Benard cell provides cellular convection having a hexagonal cross-section, as illustrated in FIGS. 5(*a*) and 5(*b*), and exhibits such a flow pattern that a fluid rises in a central portion and then falls in a peripheral portion. Here, the Rayleigh number Ra is dimensionless number representing heat transfer due to natural convection, and is expressed by the product of two dimensionless numbers, i.e., the Grashof number Gr and the Prandtl number Pr.

The Grashof number Gr is expressed by the following formula.

$$Gr=(L^3 \cdot g \cdot \gamma \cdot \Delta T)/v^2$$

where L [m]: typical size (thickness of horizontal fluid layer), g [m/s²]: acceleration of gravity, β [1/° C.]: coefficient of volume expansion, $\Delta T$[K]: temperature difference between the solid surface and the fluid, ν [m²/s]: dynamic viscosity (=μ/ρ), ρ [Pa·s]: viscosity, and ρ [kg/m²]: fluid density.

The Prandtl number Pr is expressed by the following formula.

$$Pr = v/a$$

where ν [m²/s]: dynamic viscosity, and a [m²/s]: thermometric conductivity.

Thus, the Benard cells can be formed by properly determining production conditions (i.e., the thickness of the horizontal fluid layer and the temperature difference) with respect to physical property values (i.e., the dynamic viscosity, the thermometric conductivity, and the coefficient of volume expansion) of the material.

Next, as illustrated in FIG. 4(*b*), the rectangular tray into which the melted latent heat storage material 12 has been poured is naturally cooled. With the cooling, the latent heat storage material 12 is gelled, whereby the Benard cells are fixated and the cellular regions 10 are formed. In general, the convection state changes with lowering of the temperature, whereupon the Benard cells disappear. In contrast, in the embodiment, with lowering of the temperature, the latent heat storage material 12 is gelled and fluidity is lost. Accordingly, the Benard cell structure is held and fixated without disappearing. At boundaries between the Benard cells adjacent to each other, the polygonal contour lines 16 are formed in the surface of the latent heat storage material 12.

Because the Benard cell structure is held in the gelled latent heat storage material 12, the cellular regions 10 are each formed as a columnar region demarcating the latent heat storage material 12 by planes, which include the contour lines 16, in the direction of thickness of the latent heat storage material 12. The highly heat conductive fillers 14 in the columnar region are dispersed with a bias in dispersion density.

Furthermore, in the columnar region, a central axial region including a central axis connecting upper and lower surfaces of the columnar region constituting the cellular region 10 and the vicinity of the central axis is formed to have a higher thermal conductivity characteristic in the direction of the central axis than a peripheral region on the outer side of the central axial region.

The peripheral region within the columnar region constituting the cellular region 10 is formed to have a higher heat storage characteristic than the central axial region. The highly heat conductive fillers 14 in the central axial region within the columnar region constituting the cellular region 10 are aggregated at a higher density than the highly heat conductive fillers 14 in the peripheral region. In addition, the weight of the latent heat storage material 12 in the peripheral region within the columnar region constituting the cellular region 10 is larger than that of the latent heat storage material 12 in the central axial region.

FIGS. 4(c) and 4(d) illustrate the state where the periodic pattern in combination of the cellular regions 10, which are demarcated by the hexagonal contour lines 16 and which are periodically arrayed in the vertical and horizontal directions, is formed in the surface of the gelled latent heat storage material 12 inside the rectangular tray. FIG. 4(d) illustrates the periodic pattern inside the rectangular tray when viewed at a viewing angle different from that in the case of FIG. 4(c).

As described above, by heating the latent heat storage material 12, which includes the highly heat conductive fillers 14 dispersed therein and which contains the gelling agent, under the Benard-cell forming conditions, the highly heat conductive fillers 14 can be aggregated so as to form heat conduction paths at the same time as when the Benard cells are formed. Thus, the thermal conductivity characteristic and the heat storage characteristic of the gelatinous latent heat storage material 12 can be each given with anisotropy by dispersing fine particles of the highly heat conductive fillers 14 in the latent heat storage material 12, which contains the gelling agent, under the Benard-cell forming conditions. Furthermore, the periodic pattern of independent regions in the direction of thickness of the heat storage member 1 can be formed without using a special patterning technique. Moreover, the patterned shape can be fixated by cooling the latent heat storage material 12 in the state where the Benard cells are formed. In other words, the method of producing the heat storage member according to the embodiment can easily produce the heat storage member 1 that includes independent heat conduction paths (passages) extending in the direction of thickness thereof. In addition, a heat storage cooler having high heat exchange efficiency can be constituted.

Operation of the heat storage member 1 according to the embodiment will be described below with reference to FIG. 6.

Figure 6:
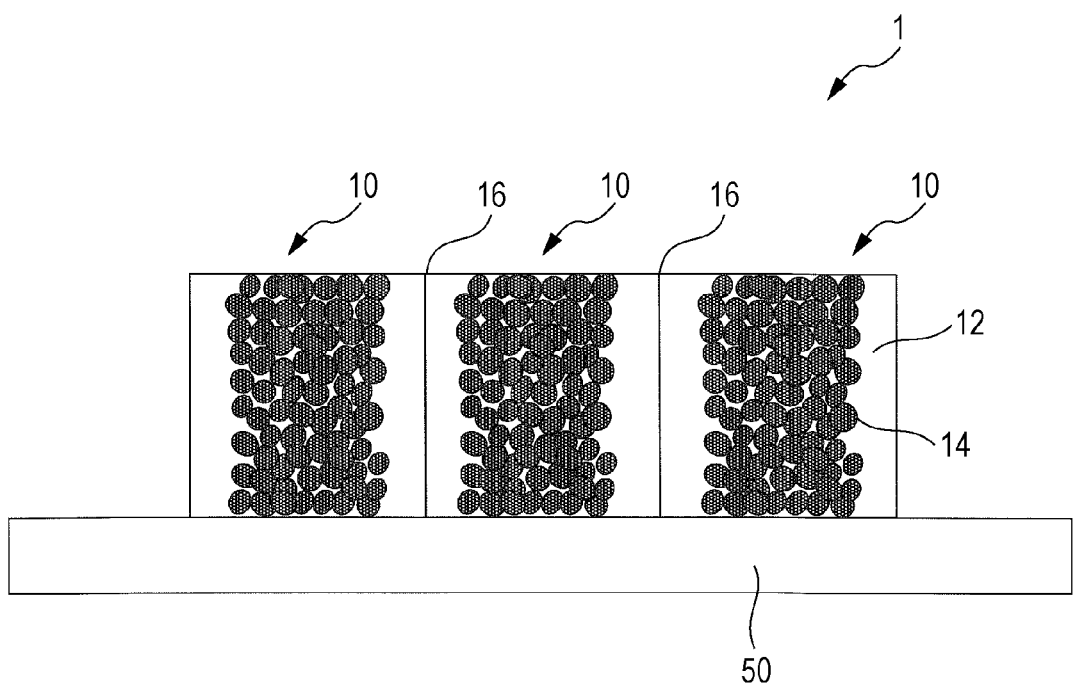
FIG. 6 is an explanatory view to explain operation of the heat storage member according to one embodiment of the present invention.

FIG. 6 illustrates a state where the rear surface of the heat storage member 1 according to the embodiment is contacted with a heat exchanger 50, and the front surface of the heat storage member 1 is exposed to a predetermined atmosphere 500.

Because, in the heat storage member 1 according to the embodiment, the high thermal conductivity characteristic is obtained in the direction of thickness thereof, heat conduction can be realized with high efficiency by bringing the rear surface of the heat storage member 1 into contact with the heat exchanger 50. Furthermore, heat of the heat exchanger 50 can be temporarily stored in the latent heat storage material 12. Stated in another way, it is possible to not only conduct the heat of the heat exchanger 50, but also to store the heat of the heat exchanger 50 with the latent heat storage material 12. As a result, thermal fluctuations in the atmosphere 500 can be smoothed and temperature fluctuations in the atmosphere 500 can be suppressed.

With the constitution described above, because of using the gelatinous latent heat storage material 12, the heat-release and heat-storage performance are less susceptible to the influence of gravity than a liquid-state heat storage material. In addition, the gelatinous latent heat storage material 12 does not causes a heat drift attributable to convection. Accordingly, a degree of freedom in arrangement of the heat storage member 1 can be increased.

The latent heat storage material 12 according to the embodiment is featured in containing the gelling agent.

Since the latent heat storage material 12 can be solidified by the gelling agent, it is possible to gel the latent heat storage material 12 and to cause fluidity thereof to disappear by lowering temperature during the production process of the heat storage member 1 in the state where the Benard cells are formed. As a result, the Benard cell structure can be avoided from disappearing and can be held in the latent heat storage material 12.

The gelling agent mixed in the latent heat storage material 12 according to the embodiment is featured in containing the polymer material. In general, the polymer material is easily available at a relatively low cost. Moreover, since the polymer material has the melting point higher than that of paraffin, which forms the heat storage material, and much lower than the boiling point of the paraffin, the polymer material is suitable as the gelling agent.

The latent heat storage material 12 according to the embodiment is featured in containing paraffin. Because the melting point of paraffin is changeable by adjusting the carbon number, paraffin is advantageous in enabling the latent heat storage material with the desired heat storage characteristic to be easily produced. For example, n-tetradecane (molecular formula: $C_{14}H_{30}$) has the melting point of 5.9° C. and the melting heat amount of 229.8 kJ/kg; n-pentadecane (molecular formula: $C_{15}H_{32}$) has the melting point of 9.9° C. and the melting heat amount of 163.8 kJ/kg; n-hexadecane (molecular formula: $C_{16}H_{34}$) has the melting point of 18.2° C. and the melting heat amount of 228.8 kJ/kg; n-heptadecane (molecular formula: $C_{17}H_{36}$) has the melting point of 22.0° C. and the melting heat amount of 168.4 kJ/kg; n-octadecane (molecular formula: $C_{18}H_{38}$) has the melting point of 28.2° C. and the melting heat amount of 234.6 kJ/kg; n-nonadecane (molecular formula: $C_{19}H_{40}$) has the melting point of 32.1° C. and the melting heat amount of 170.6 kJ/kg; and n-icosane (molecular formula: $C_{20}H_{42}$) has the melting point of 36.8° C. and the melting heat amount of 237.3 kJ/kg.

The latent heat storage material 12 according to the embodiment is featured in coming into direct contact with the heat exchanger 50. Since the latent heat storage material 12 according to the embodiment maintains the solidified state regardless of the phase change state, the latent heat storage material 12 can be brought into direct contact with the heat exchanger 50 and can absorb heat with higher efficiency.

The heat stored in the latent heat storage material 12 can be utilized instead of the heat exchanger 50 in the case of heat conduction from the heat exchanger 50 being reduced. Therefore, the heat storage member 1 according to the embodiment can contribute to keeping temperature of the atmosphere 500 constant or to leveling the temperature.

Related-art latent heat storage materials used up to date are liquefied when melted. There is also known a latent heat storage material mixed with a liquid substance. Those latent heat storage materials have to be enclosed in a container, and heat can be received only through a container wall. In other words, in related-art structures, heat cannot be stored in the state where the heat storage material is held in direct contact with the heat exchanger. In contrast, the embodiment enables the latent heat storage material 12 to efficiently store heat from the heat exchanger 50 in the state where the heat storage material 12 is held in direct contact with the heat exchanger 50.

As application fields of the heat storage member 1 according to the embodiment described above, the heat storage member 1 can be not only employed for cold reserving in a refrigerator and so on, but also applied to a heat exchanger that is required to have the predetermined heat storage capacity and high heat exchange efficiency.

According to the above-described embodiment, by dispersing the highly heat conductive fillers under the conditions that the Benard cells are formed through convection, the heat conduction paths independent of each other in the planar direction can be easily formed without a patterning process. Therefore, the thermal conductivity can be increased while the heat storage performance is maintained, and the efficiency of the heat exchanger can be improved. It is to be noted that the size of the Benard cells can be changed by controlling the temperature, the thickness, the viscosity, and so on.

The present invention is not limited to the above-described embodiment, and it can be variously modified.

For instance, the shape and the size of the heat storage member 1 according to the embodiment can be changed as appropriate. The shape of the heat storage member 1 may not be rectangular, and it may be polygonal, circular, or elliptic.

The cellular regions 10 of the heat storage member 1 according to the embodiment may not be in the form of hexagonal columns. Depending on the shape of the Benard cells formed in the production process, the cellular regions 10 may be in the form of polygonal, circular-cylindrical, elliptic-cylindrical, or other arbitrarily-shaped columns instead of the hexagonal columns. Furthermore, the sizes of the individual cellular regions 10 may not be uniform. In addition, the contour lines 16 having polygonal, circular-cylindrical, and other shapes may exit in the plural cellular regions 10 in a mixed state.

The matters explained in the above detailed description can be combined with each other.

INDUSTRIAL APPLICABILITY

The present invention can be widely applied to a heat storage member that is required to have the predetermined heat storage performance, and a heat exchanger that is required to have the predetermined heat storage capacity and high heat exchange efficiency.

REFERENCE SIGNS LIST 1 heat storage member
10 cellular region
12 latent heat storage material
14 highly heat conductive filler
16 contour line
50 heat exchanger
500 atmosphere

The invention claimed is:
1. A heat storage member comprising:
a gelatinous latent heat storage material; and
a plurality of heat conductive fillers dispersed in the latent heat storage material,
wherein a plurality of Benard cells are each defined by a polygonal contour line in a first surface of the latent heat storage material,
wherein each of the plurality of Benard cells defines a single cellular region, each of the cellular regions comprising:
a columnar region demarcating the latent heat storage material, in a direction of thickness of the latent heat storage material, and
the plurality of heat conductive fillers dispersed in the columnar region of each of the plurality of Benard cells with a bias in dispersion density,
wherein a central axial region defined by a central axis of the columnar region of each of the plurality of Benard cells, extends from the first surface to a second surface of the columnar region, wherein the second surface is located below the first surface, and wherein the central axial region has a higher thermal conductivity in a direction of the central axis than a peripheral region that completely surrounds the central axial region within the columnar region, and
wherein the plurality of heat conductive fillers in the central axial region of each of the plurality of Benard cells are aggregated at a higher density than the plurality of heat conductive fillers in the peripheral region of each of the plurality of Benard cells.

2. The heat storage member according to claim 1, wherein the peripheral region of each of the plurality of Benard cells has a higher heat storage characteristic than the central axial region of each of the plurality of Benard cells.

3. The heat storage member according to claim 2, wherein a weight of the latent heat storage material in the peripheral region of each of the plurality of Benard cells is larger than a weight of the latent heat storage material in the central axial region of each of the plurality of Benard cells.

4. The heat storage member according to claim 1, wherein the cellular regions define a periodic pattern periodically arrayed in vertical and horizontal directions relative to the first surface.

5. The heat storage member according to claim 1, wherein the heat storage material contains a gelling agent.

6. The heat storage member according to claim 1, wherein the gelling agent contains a polymer material.

7. The heat storage member according to claim 1, wherein the latent heat storage material contains paraffin.

* * * * *